(12) United States Patent
Suzuki

(10) Patent No.: US 8,583,862 B2
(45) Date of Patent: Nov. 12, 2013

(54) RECORDING MEDIUM, DRIVE DEVICE, AND MOUNTING METHOD

(75) Inventor: Toshimasa Suzuki, Shinjuku (JP)

(73) Assignee: Fujitsu Semiconductor Limited, Yokohama (JP)

( * ) Notice: Subject to any disclaimer, the term of this patent is extended or adjusted under 35 U.S.C. 154(b) by 684 days.

(21) Appl. No.: 12/545,177

(22) Filed: Aug. 21, 2009

(65) Prior Publication Data

US 2010/0082914 A1 Apr. 1, 2010

(30) Foreign Application Priority Data

Oct. 1, 2008 (JP) ................................ 2008-255933

(51) Int. Cl.
*G06F 13/00* (2006.01)
*G06F 13/28* (2006.01)

(52) U.S. Cl.
USPC ....... 711/112; 711/113; 711/154; 711/E12.19

(58) Field of Classification Search
None
See application file for complete search history.

(56) References Cited

U.S. PATENT DOCUMENTS

| | | | | |
|---|---|---|---|---|
| 7,752,412 | B2 * | 7/2010 | Tomlin et al. | 711/170 |
| 7,949,865 | B1 * | 5/2011 | Yadav | 713/1 |
| 2007/0022265 | A1 * | 1/2007 | Nishikawa et al. | 711/162 |
| 2007/0157013 | A1 * | 7/2007 | Park | 713/1 |

FOREIGN PATENT DOCUMENTS

| | | |
|---|---|---|
| JP | 2004-362426 | 12/2004 |
| JP | 2005-141335 | 6/2005 |
| JP | 2008-186542 | 8/2006 |
| JP | 2007-114914 | 5/2007 |
| KR | 2007-73290 | 7/2007 |

OTHER PUBLICATIONS

Communication issued from the Korean Patent Office on Dec. 30, 2010 in the corresponding Korean patent application.
Japanese Office Action issued Jul. 3, 2012 in corresponding Japanese Patent Application No. 2008-255933.
Japanese Office Action mailed Jan. 29, 2013 in corresponding Japanese Patent Application No. 2008-255933.

* cited by examiner

*Primary Examiner* — Reginald Bragdon
*Assistant Examiner* — Eric S Cardwell
(74) *Attorney, Agent, or Firm* — Staas & Halsey LLP

(57) ABSTRACT

A recording medium coupled to a drive device includes a management information storage area and a master boot record. Management information used for a mounting process of the recording medium by the drive device is stored in the management information storage area and a starting location and an area size of a drive area is stored in the master boot record.

18 Claims, 19 Drawing Sheets

US 8,583,862 B2

RECORDING MEDIUM, DRIVE DEVICE, AND MOUNTING METHOD

CROSS-REFERENCE TO RELATED APPLICATIONS

This application claims the benefit of priority from Japanese Patent Application No. 2008-255933 filed on Oct. 1, 2008, the entire contents of which are incorporated herein by reference.

BACKGROUND

1. Field

The embodiments discussed herein relate to a recording medium coupled to a drive device and the like.

2. Description of Related Art

A recording/reproducing apparatus such as a digital camera, a cell phone, and a portable AV (Audio Visual) player includes a drive device for coupling to an external recording medium. A Compact Flash (CF), a Memory Stick (MS), a Secure Digital (SD) memory, or a DVD is provided as the recording medium.

For example, a related technology is disclosed in Japanese Laid-open Patent Publication No. 2005-141335 or the like.

SUMMARY

According to one aspect of embodiments, a recording medium coupled to a drive device includes a management information storage area and a master boot record. Management information used for a mounting process of the recording medium by the drive device is stored in the management information storage area and a starting location and an area size of a drive area is stored in the master boot record.

Additional advantages and novel features of the invention will be set forth in part in the description that follows, and in part will become more apparent to those skilled in the art upon examination of the following or upon learning by practice of the invention.

DESCRIPTION OF EMBODIMENTS

Figure 1:
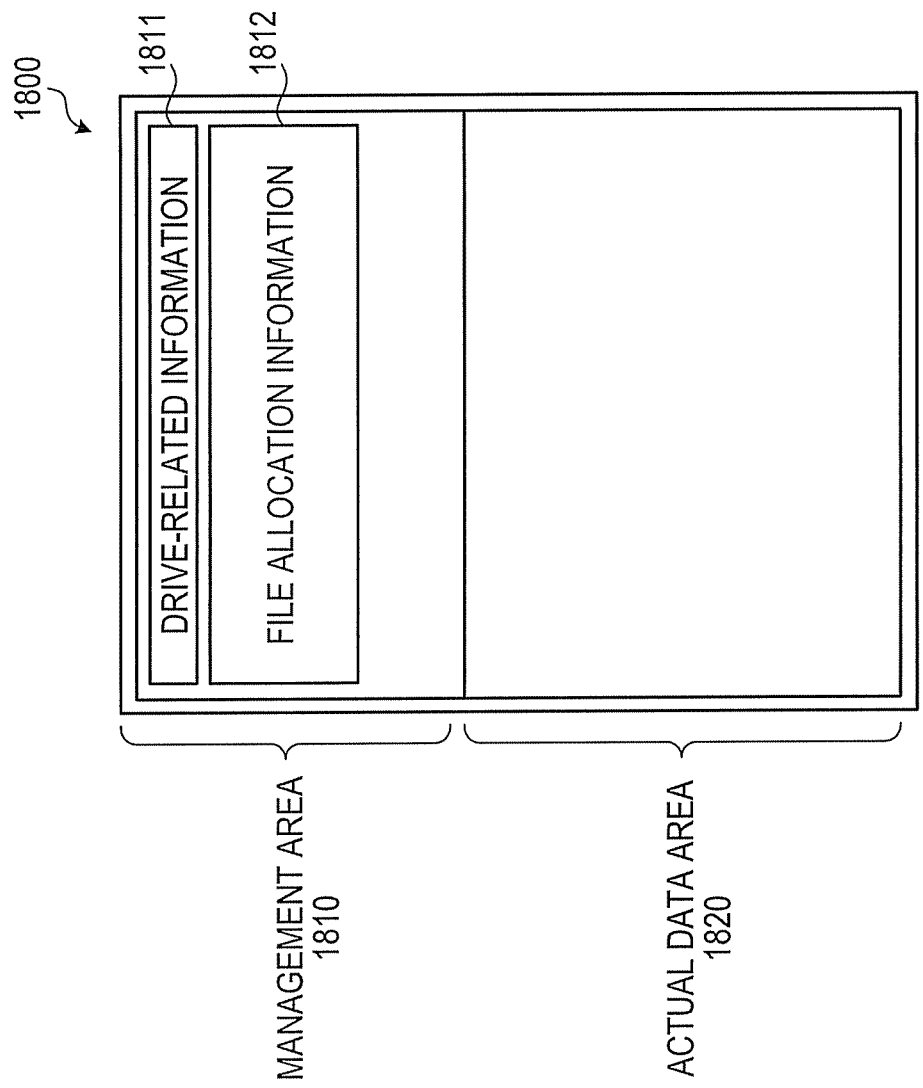
FIG. 1 illustrates an exemplary data structure of a recording medium.

FIG. 1 illustrates an exemplary data structure of a recording medium. A recording medium 1800 includes a management area 1810 storing data structure information and an actual data area 1820 storing actual data to be reproduced. The management area 1810 stores drive-related information 1811 and file allocation information 1812. For example, boot sector information is stored in the drive-related information 1811 when a File Allocation Tables (FAT) file system is applied, and volume configuration information is stored in the drive-related information 1811 when a Universal Disk Format (UDF) file system is applied.

FAT information is stored in the file allocation information 1812 when the FAT file system is applied, and space bitmap information is stored in the file allocation information 1812 when the UDF file system is applied. The file allocation information 1812 indicates a correspondence between file head location information, such as a logical address, of actual data as entry information and location information, such as a physical address, stored in the actual data area 1820. In either file system, the amount of information stored in the file allocation information 1812 increases as the content of the actual data area 1820 increases.

Figure 2:
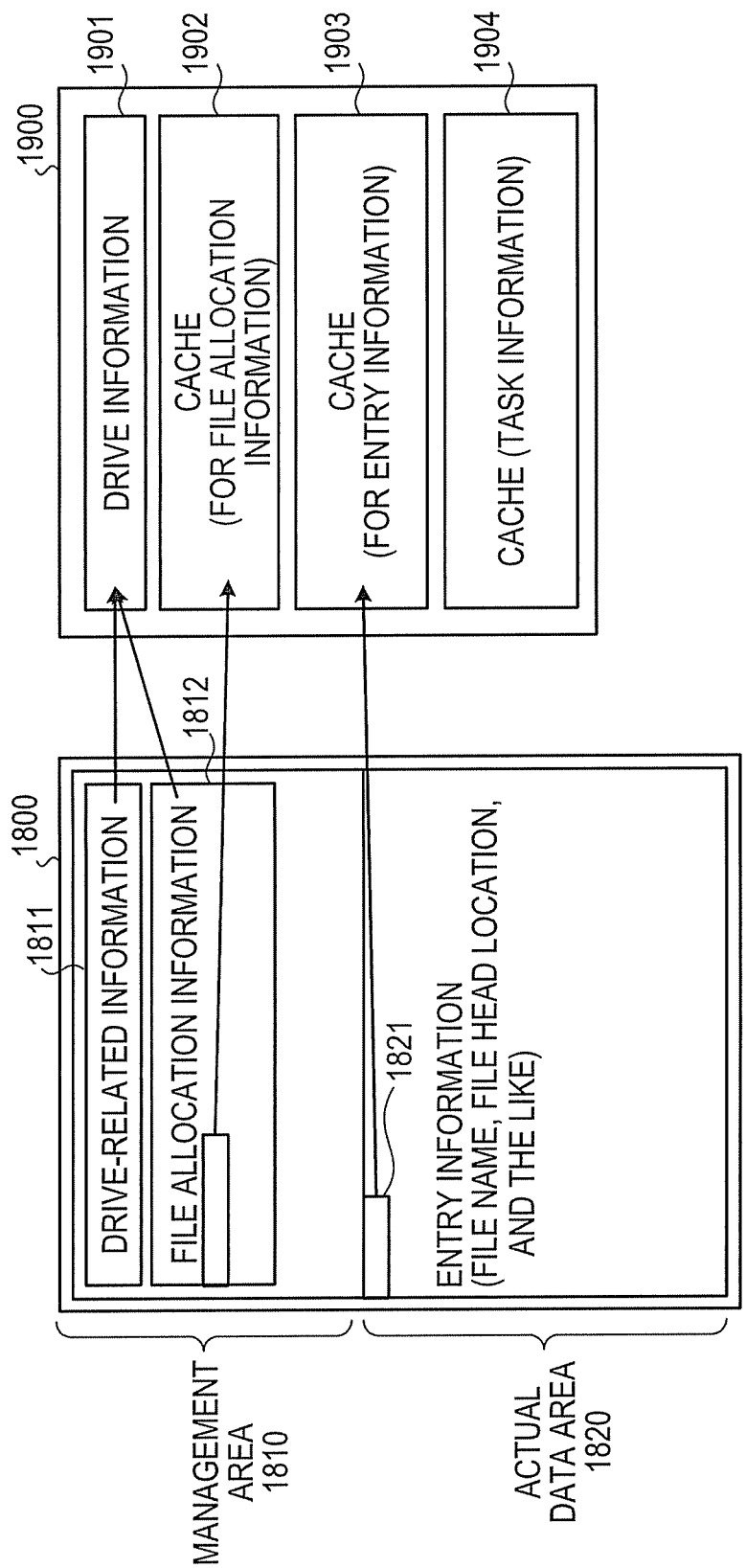
FIG. 2 illustrates an exemplary mounting process.

After a mounting process is executed by the recording medium 1800 being coupled to a drive device mounted on a recording/reproducing apparatus, a read operation or a write operation from and to the recording medium 1800 is performed. FIG. 2 illustrates an exemplary mounting process.

When the recording medium 1800 is mounted, a Micro Processing Unit (MPU) of the drive device extracts part of information stored in the management area 1810 and the actual data area 1820 and writes the information into an internal memory 1900, such as a cache 1902 or 1903 of a RAM, mounted on the drive device. A cache 1904 is initialized by a value, such as "0", before the mounting process and is updated when a drive or a directory is set or changed. When the drive device loads the actual data of the recording medium 1800, the cache 1902, 1903, or 1904 of the internal memory 1900 is searched to attain fast loading.

The cache 1904 is initialized with a value such as "0" before the mounting process of the drive device. In the mounting process, part of the drive-related information 1811 and the file allocation information 1812 and other information, such as information related to a file system process, are extracted from the management area 1810 and written into the internal memory 1900 as drive information 1901. From the management area 1810 to the entire area of the file allocation information 1812 (from the top to the bottom) is examined to check the availability of drive. After the top part of the file allocation information 1812 is written into the cache 1902 of the internal memory 1900 and the top part of entry information 1821 of the actual data area 1820 is written into the cache 1903 of the internal memory 1900, the mounting process is completed.

Since the mounting process including the drive availability check includes a process for searching information, a lot of time may be taken for the mounting process.

Information for the mounting process is extracted as mounting information from management information corresponding to the data structure of the recording medium, such as drive information. The extracted mounting information is stored in a dedicated storage area, and the information is held, being distinguished from other information. The mounting information is preferentially loaded in the mounting process. Therefore, the processing time is reduced, and the mounting process is sped up.

Figure 3:
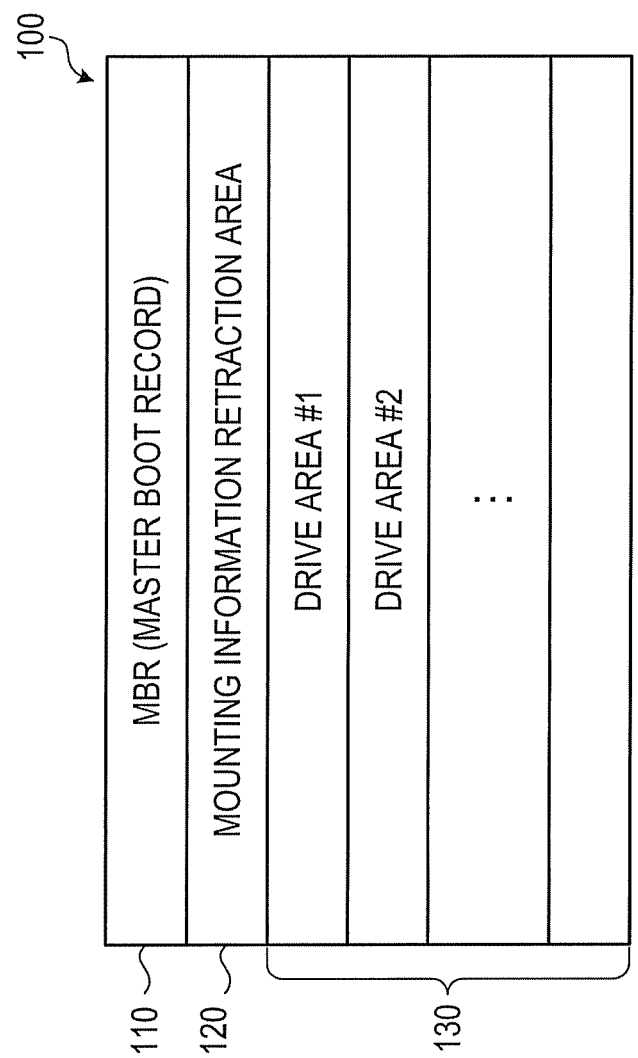
FIG. 3 illustrates a first embodiment.

FIG. 3 illustrates a first embodiment. For example, a mounting process is executed to the recording medium 100. A mounting information retraction area 120 and drive areas 130 for storing the actual data are arranged in stages subsequent to a master boot record (MBR) 110 arranged at the top sector.

The MBR 110 is an area included in the recording medium 100 and stores information loaded during booting, such as starting location information and size information of the drive areas inside the recording medium. The mounting information retraction area 120 may be a mounting information storage area for storing mounting information. The mounting information is management information that is used by the drive device to mount the drive areas 130 for storing the actual data. The mounting information is included in management information, which is used upon loading the drive areas 130 for storing the actual data, such as drive information. A size of the mounting information per drive is 184 byte and a name of the mounting information and the size of the mounting information will be explained.

The mounting information includes information of the number of drives to be mounted (2 bytes), mounting level information (2 bytes), mounting start location (4 bytes), drive-related information (84 bytes), availability of drive (8 bytes), information of the number of consecutively arranged data (80 bytes), or information of the maximum number of consecutive accesses (4 bytes). The information of the number of drives to be mounted is provided to all drives, for example. The mounting level information includes, for example, normal mounting or specific state mounting.

A normal mounting process corresponding to the normal mounting and a specific state mounting process corresponding to the specific state mounting are executed in the first embodiment. The normal mounting process makes the coupled recording medium 100 operable by the drive device. The specific state mounting process is a mounting process for reading a specific file set by a user and setting a specific state, such as a pause or a suspension after the normal mounting. The specific file includes, for example, information of one or more generations including information of one or more drives, directories, or files that are most recently accessed.

The mounting information corresponding to the specific state mounting includes cache storage information for file allocation information (6.2 K bytes), cache storage information for entry information (520 bytes to 64.1 K bytes), or cache storage information for task information (680 bytes to 60.7 K bytes) in addition to the mounting information. The capacity of the cache storage information for entry information depends on a minimum unit (cluster size) manageable by a file system applied to the recording medium 100. The capacity of the cache storage information for task information depends on a depth of an active directory hierarchy.

The drive information includes drive management information, internal function handling address information, or the like other than the mounting information.

The mounting information is extracted from the drive information and stored in a dedicated area such as a mounting information retraction area. During the execution of the mounting process, the retracted mounting information is preferentially read to attain a fast mounting process.

Figure 4:
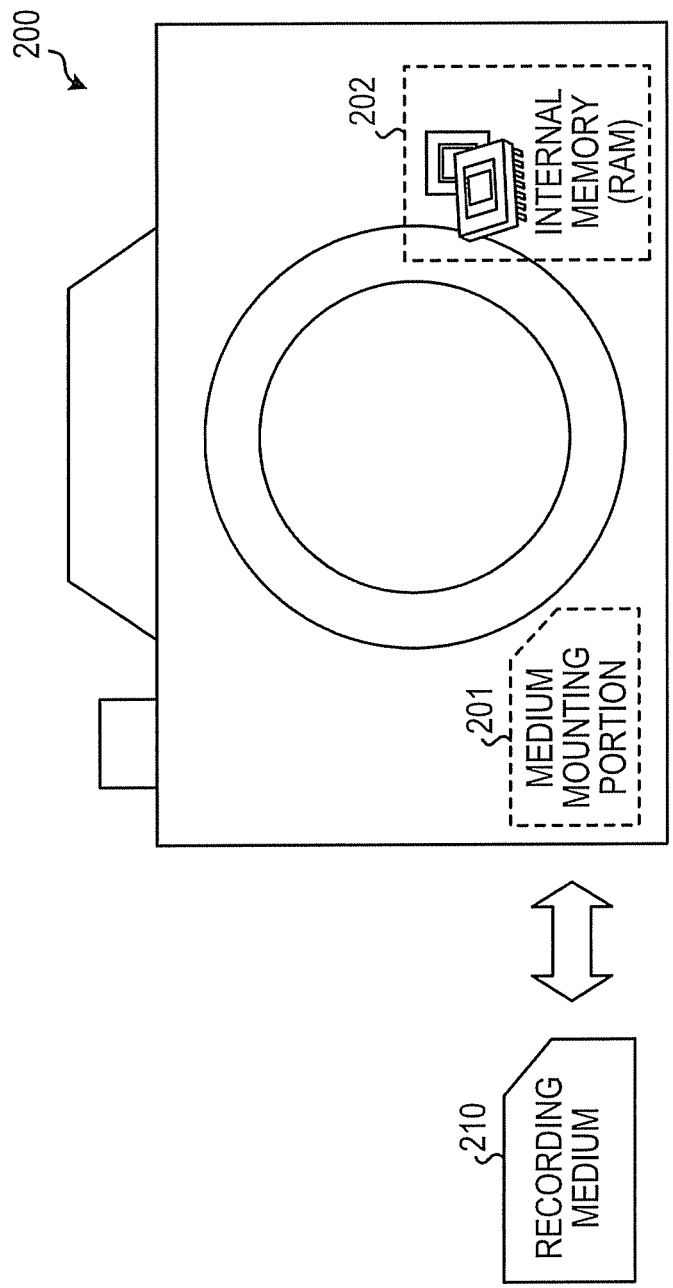
FIG. 4 illustrates an exemplary drive device.

FIG. 4 illustrates an exemplary drive device. In FIG. 4, a mounting information retraction area is arranged inside a recording medium. For example, a recording medium 210 is coupled to a medium mounting portion 201 when the recording medium 210 is coupled to a digital camera 200. The mounting information stored inside the recording medium 210 is written into an internal memory 202, such as a RAM, thereby providing for a fast mounting process to be executed.

Figure 5:
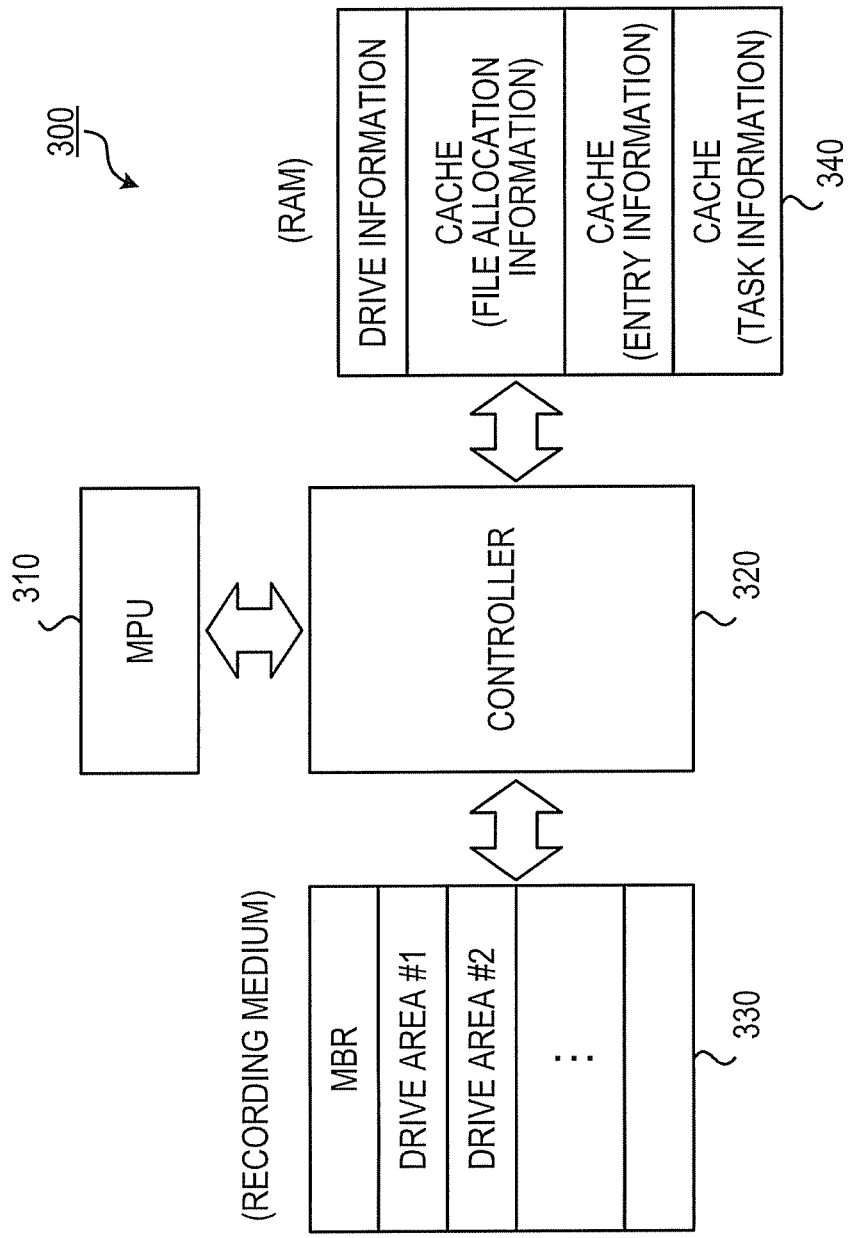
FIG. 5 illustrates another exemplary drive device.
Figure 6:
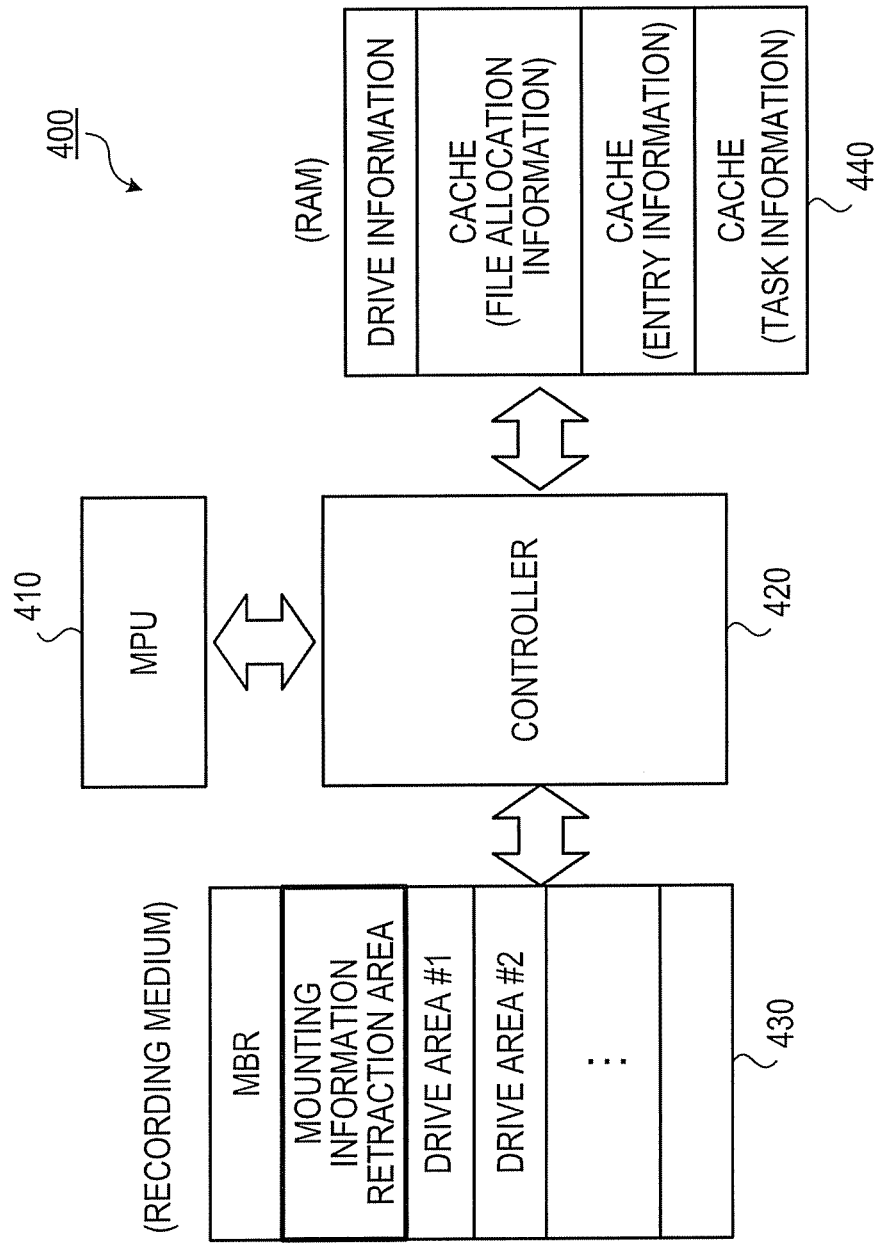
FIG. 6 illustrates another exemplary drive device.

FIG. 5 illustrates another exemplary drive device. FIG. 6 also illustrates another exemplary drive device. A drive device 300 illustrated in FIG. 5 includes an MPU 310, a controller 320, an internal memory 340 such as a RAM, and a recording medium 330. A drive device 400 illustrated in FIG. 6 includes an MPU 410, a controller 420, an internal memory 440 such as a RAM, and a recording medium 430. The recording medium 430 illustrated in FIG. 6 includes a mounting information retraction area.

In the first embodiment, the MPU 410 includes an extracting unit that extracts mounting information from the internal memory 440 for storing drive information and a function unit that writes the extracted mounting information into the mounting information storage area. The MPU 410 includes a function unit that uses the mounting information to execute a mounting process of the recording medium 410.

Figure 7:
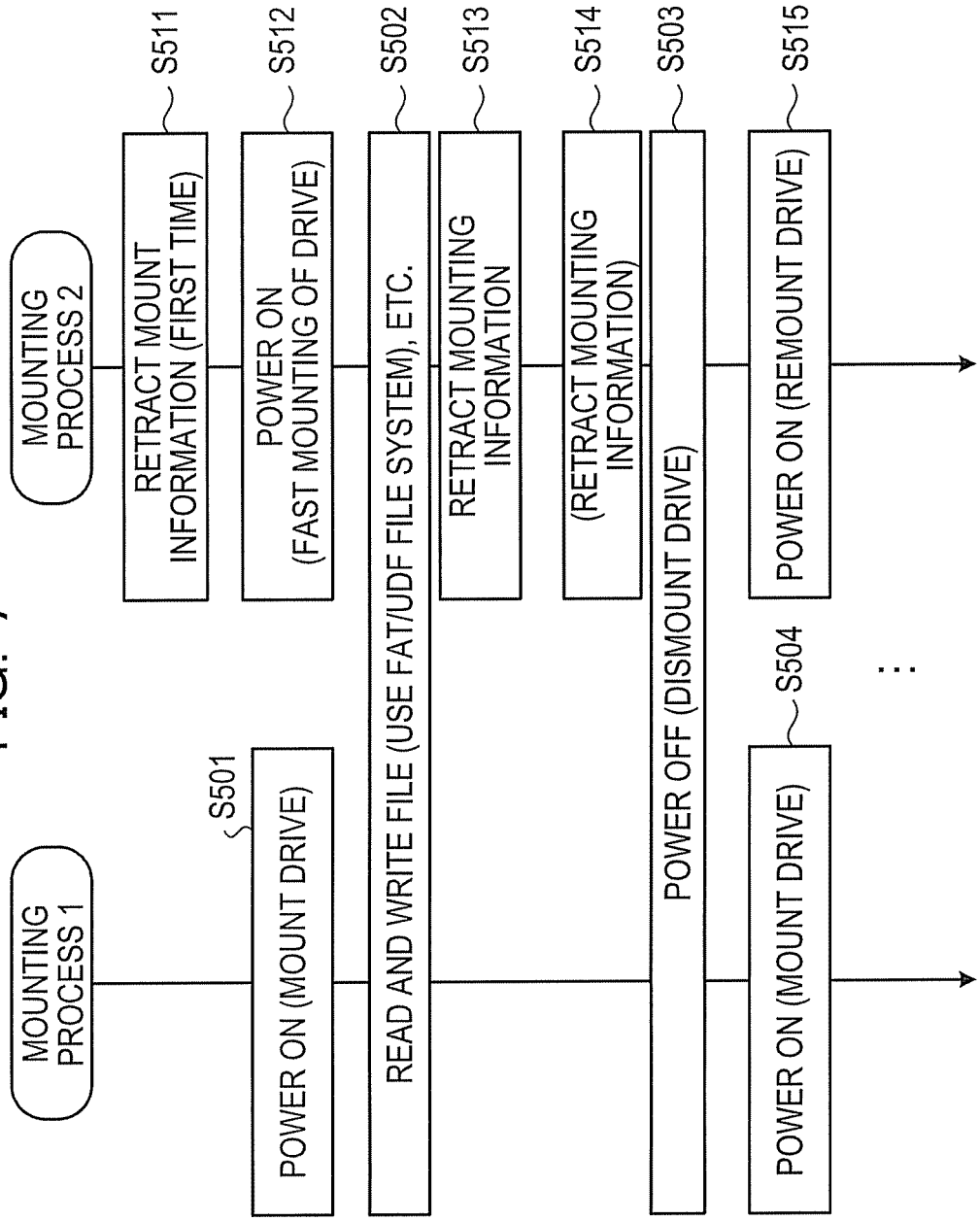
FIG. 7 illustrates an exemplary mounting process.

FIG. 7 illustrates an exemplary mounting process. In a mounting process 1 illustrated in FIG. 7, the MPU 310 executes a mounting process command upon power-on to mount a drive (operation S501), a read operation, a write operation, or the like of file is performed according to the applied file system (operation S502), and the MPU 310 executes a dismounting process command upon power-off to dismount the drive (operation S503). The drive is mounted by the next power-on (operation S504).

In a mounting process 2 illustrated in FIG. 7, the mounting information is retracted to the mounting information retraction area (operation S511). The MPU 410 executes a mounting process command upon power-on to mount a drive (operation S512). In the mounting process of operation S512, a fast mounting process is executed because the mounting information is only loaded.

Reading and writing of file are performed according to the applied file system (operation S502). The mounting information is retracted to the mounting information retraction area at the timing that the cache is updated upon reading or writing of file (operation S513). The retraction of the mounting information of operation S513 corresponds to the writing process of the mounting information reflecting the file reading and writing process of operation S502.

The MPU 410 retracts the mounting information to the mounting information retraction area upon power-off as a process prior to dismounting (operation S514). The MPU 410 executes a dismounting process command to execute a dismounting process (operation S503). The drive is mounted by the next power-on (operation S515).

The retraction process of the mounting information is added in the mounting process 2 illustrated in FIG. 7. However, when the mounting information retracted in the mounting information retraction area is written to the drive information of the internal memory in the mounting process, a searching process, which takes a lot of time, is not executed. Therefore, the processing time is reduced.

Figure 8:
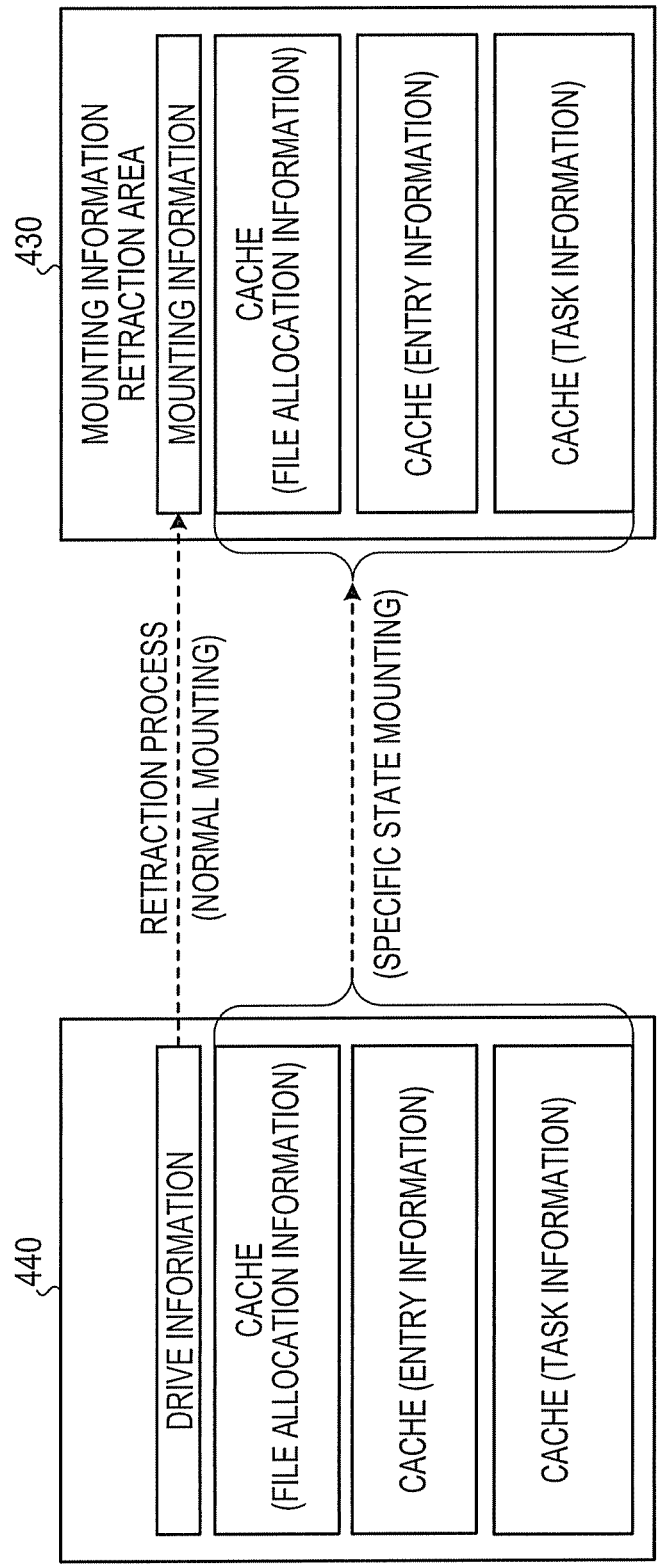
FIG. 8 illustrates an exemplary retraction process of mounting information.

FIG. 8 illustrates an exemplary retraction process of the mounting information. In the normal mounting, the mounting information extracted from the drive information is retracted to the mounting information retraction area, and the process ends. In the specific state mounting, a specific state, such as file allocation information, entry information, and task information, is retracted to the mounting information retraction area other than the mounting information.

The drive device 400 executes the retraction process of the mounting information, for example, upon the first creation of the mounting information, upon reading/writing of file, or upon dismounting. Reading/writing of file includes the timing that the updated content of cache is written into the recording medium.

Figure 9:
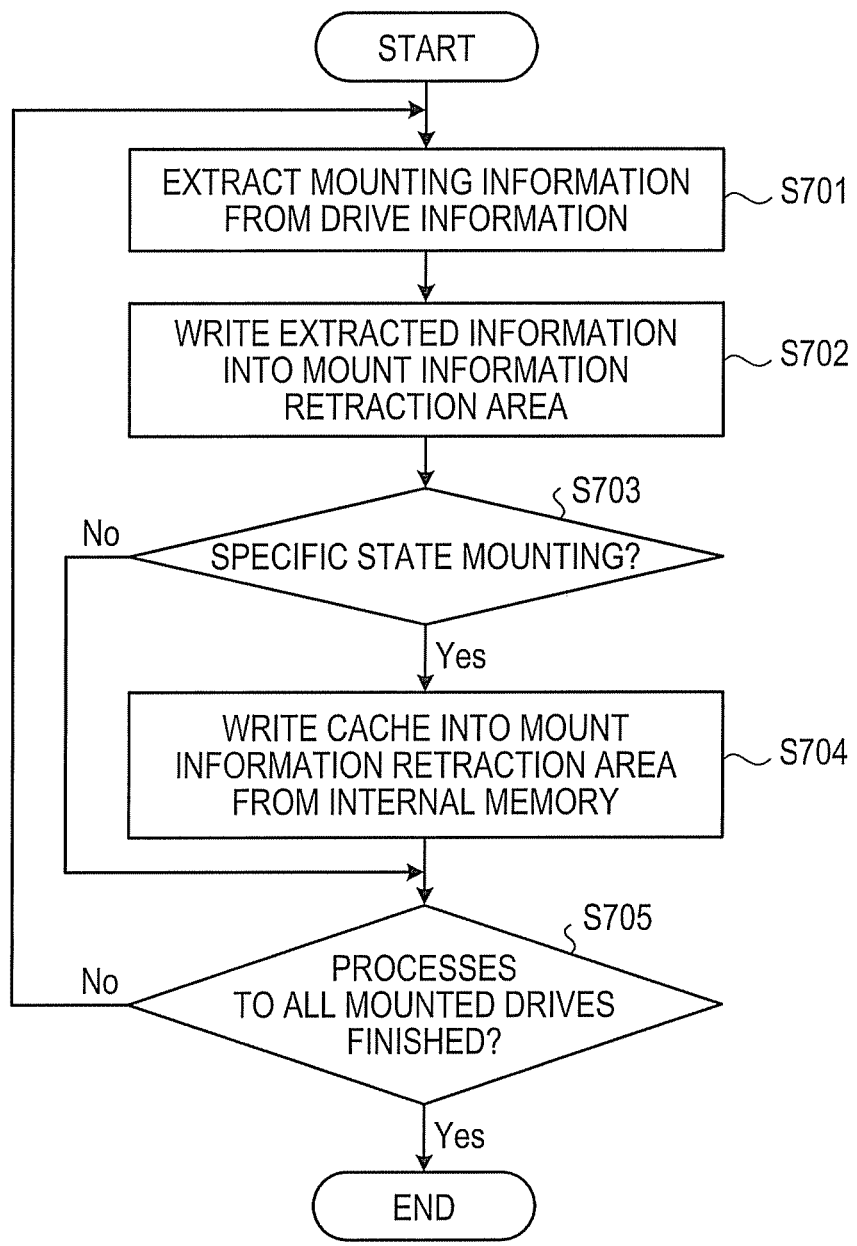
FIG. 9 illustrates an exemplary procedure of a retraction process of a mounting information.

FIG. 9 illustrates an exemplary procedure of a retraction process of a mounting information. In a flow chart of FIG. 9, the MPU 410 of the drive device 400 extracts the mounting information from the drive information stored in the internal memory 440 (operation S701). The extracted mounting information is written into the mounting information retraction area of the recording medium 430 (operation S702).

Whether the process is the specific state mounting or not is determined (operation S703). If the process is determined to be the specific state mounting (operation S703: Yes), the file allocation information, the entry information, and the task information are written into the cache of the mounting information retraction area of the recording medium 430 from the cache of the internal memory 440 (operation S704). If the process is determined not to be the specific state mounting in operation S703 (operation S703: No), the process moves to operation S705.

Whether the processes to all drives to be mounted are finished or not is determined (operation S705). The processes from operation S701 are repeated until the processes to all drives are finished (operation S705: loop of No). When the processes to all drives are finished (operation S705: Yes), the retraction process ends. In the retraction process of the mounting information, information is transferred between the cache of the recording medium 430 and the cache of the specific area of the internal memory 440. For example, the transferred information may be information extracted from the management area 1810 illustrated in FIG. 2. Therefore, the retraction process time is reduced.

Figure 10:
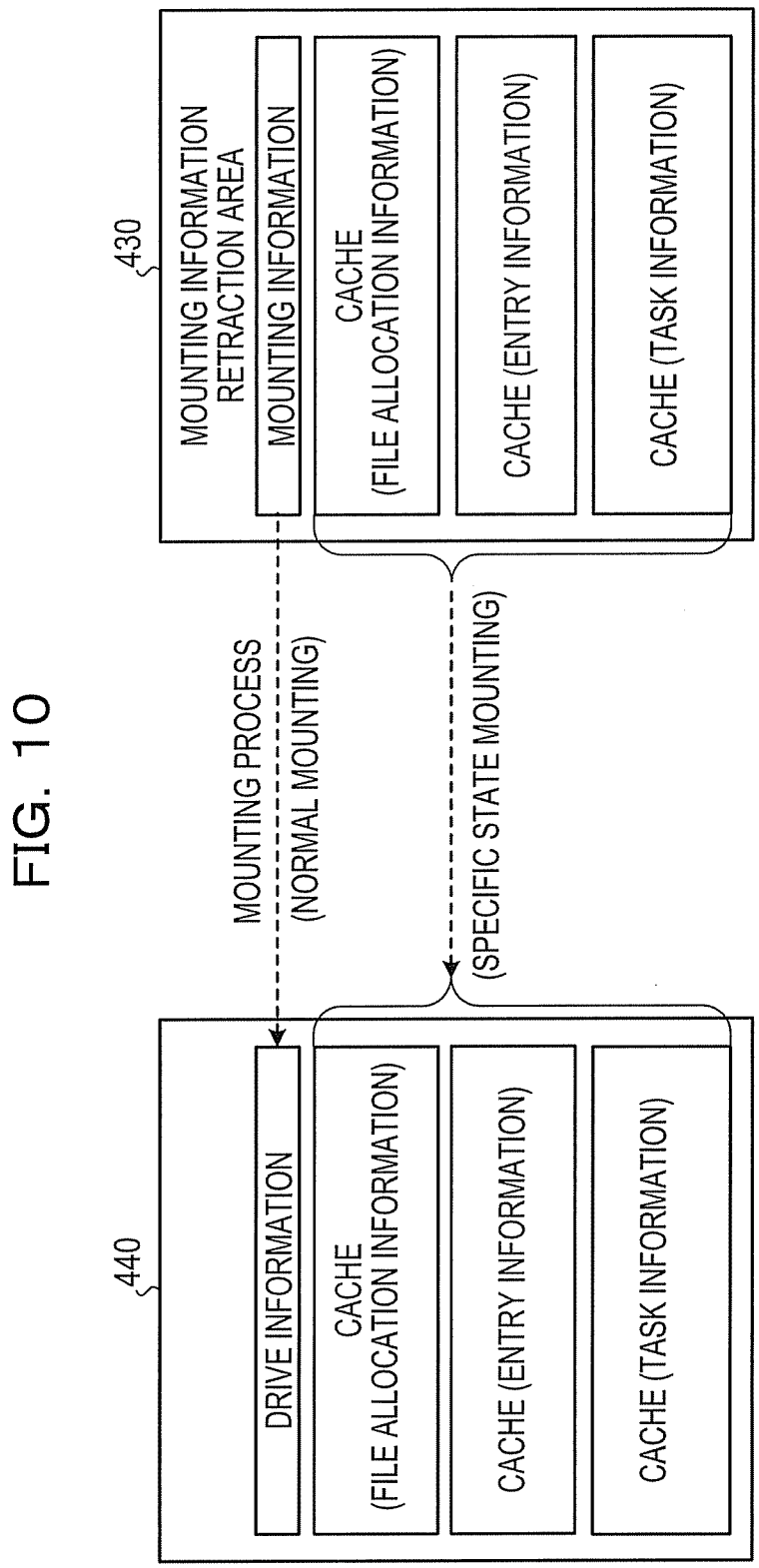
FIG. 10 illustrates an exemplary mounting process.

FIG. 10 illustrates an exemplary mounting process. The timing of the mounting process may be substantially the same as the timing illustrated in FIG. 7. In the normal mounting, the mounting information is written into the drive information to mount the recording medium 430. In the specific state mounting, the file allocation information, the entry information, and the task information stored in the cache of the mounting information retraction area are written into the cache of the internal memory 440. Therefore, a searching process, which takes a lot of time, is not executed.

Figure 11:
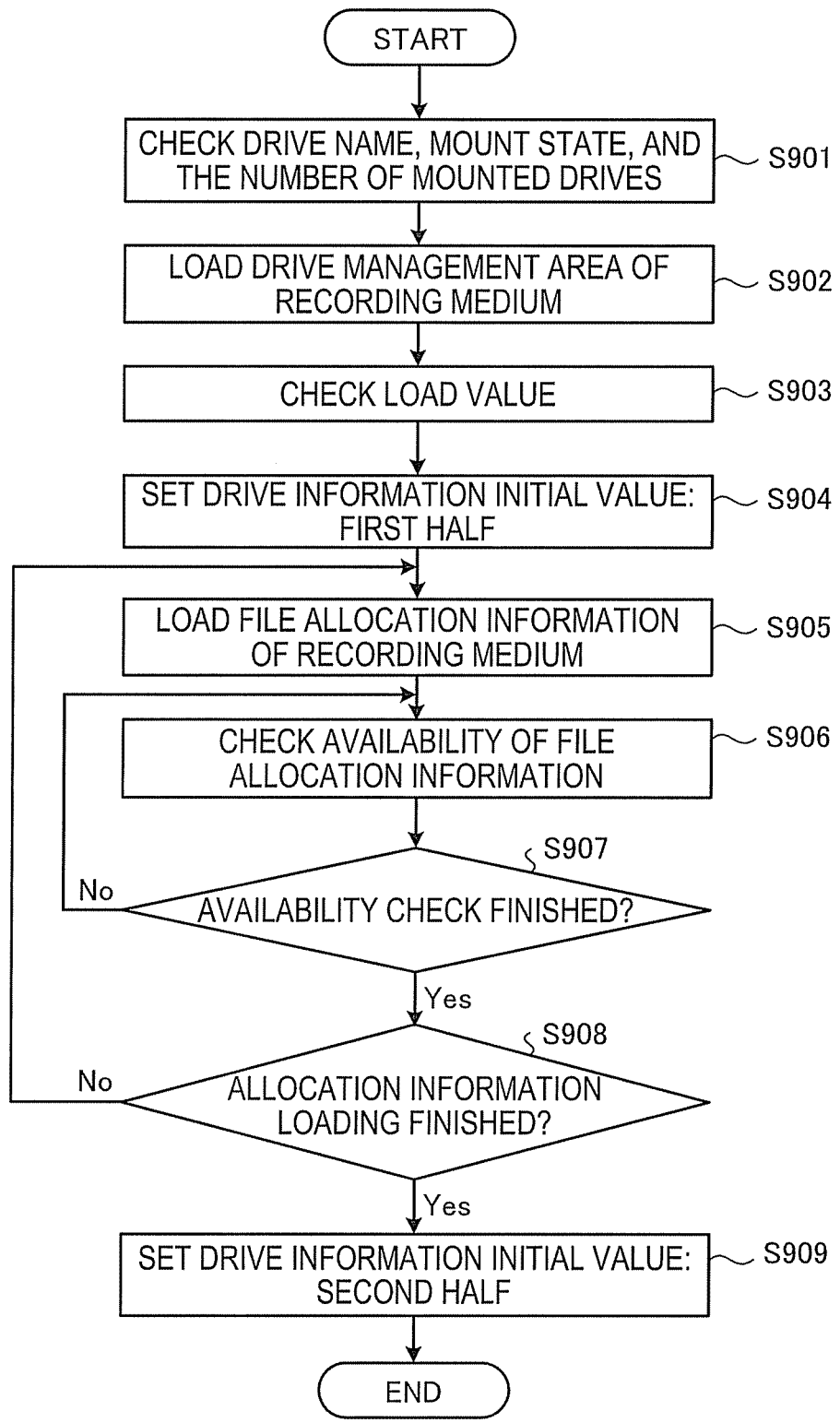
FIG. 11 illustrates an exemplary procedure of a mounting process.

FIG. 11 illustrates an exemplary procedure of the mounting process. In a flow chart of FIG. 11, the MPU 310 of the drive device 300 checks the drive name of the recording medium 330, the mount state, and the number of mounted drives (operation S901). The MPU 310 loads a drive management area of the recording medium (operation S902) and checks a load value (operation S903).

The first half of a drive information initial value is set (operation S904), the file allocation information of the recording medium is loaded (operation S905), and the availability of the file allocation information is checked (operation S906). Whether the availability check of operation S906 is finished or not is determined (operation S907). The checking of operation S906 is repeated until the check is finished (operation S907: loop of No).

When the availability check is finished in operation S907 (operation S907: Yes), whether the loading of the location information is finished or not is determined (operation S908). If the loading of the location information is not finished, the next location information is loaded in the process of operation S905 (operation S908: loop of No).

If the loading of the location information is determined to be finished in operation S908 (operation S908: Yes), the second half of the drive information initial value is set (operation S909), and a series of mounting processes ends.

Figure 12:
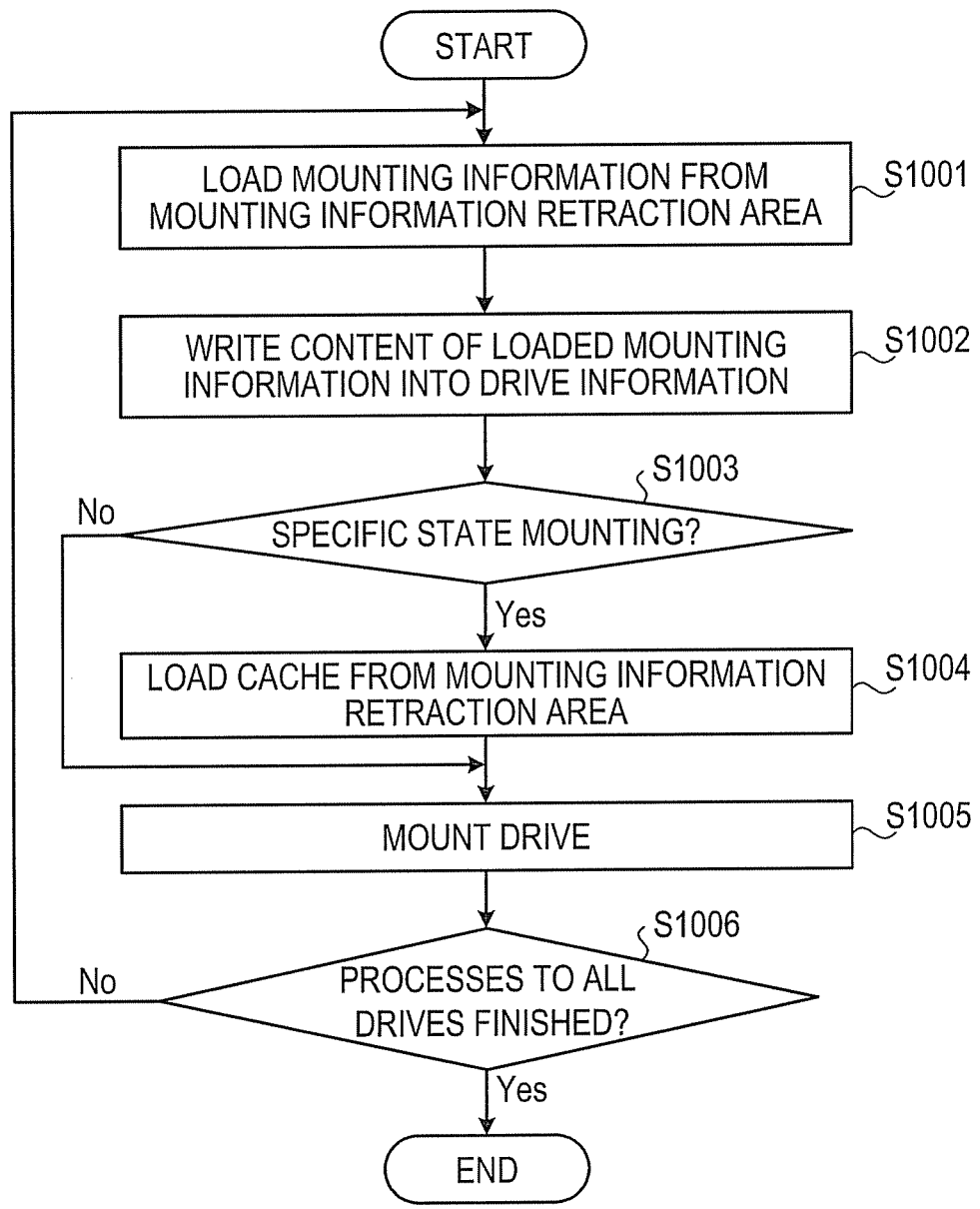
FIG. 12 illustrates another exemplary a procedure of a mounting process.

FIG. 12 illustrates another exemplary procedure of the mounting process. In a flow chart of FIG. 12, the MPU 410 of the drive device 400 reads mounting information stored in the mounting information retraction area (operation S1001).

The mounting information loaded in operation S1001 is written into the drive information of the internal memory 440 (operation S1002). Whether the process is specific state mounting or not is determined (operation S1003). If the process is determined to be the specific state mounting (operation S1003: Yes), the file allocation information, the entry information, and the task information are read from the cache of the mounting information retraction area (operation S1004) and written into the cache of the internal memory 440.

A drive is mounted based on the mounting information stored in operation S1002 (operation S1005). If the process is determined not to be the specific state mounting in operation S1003 (operation S1003: No), mounting is performed in operation S1005.

Whether the processes to all drives to be mounted are finished or not is determined (operation S1006). The processes from operation S1001 are repeated until the processes to all drives are finished (operation S1006: loop of No). If the processes to all drives are finished (operation S1006: Yes), the mounting process ends.

If the recording media 330 and 430 are 4 GB SD cards, the loop of operation S907 of FIG. 11 may be executed about 4000 times at the maximum. The loop of operation S908 may be executed about 90 times. In FIG. 12, the reading from the recording medium 430 may be one time in operation S1001.

The recording medium 330 with a reading speed slower than that of the internal memory 340 may be accessed many times, and whether the read value is suitable for mount process or not may be checked. When the mounting information is retracted to the mounting information retraction area, the mounting information is transferred from the mounting information retraction area to the internal memory 440. There may be almost no access to the recording medium 430, and the read value may not be checked. Therefore, the processing time is reduced.

Figure 13:
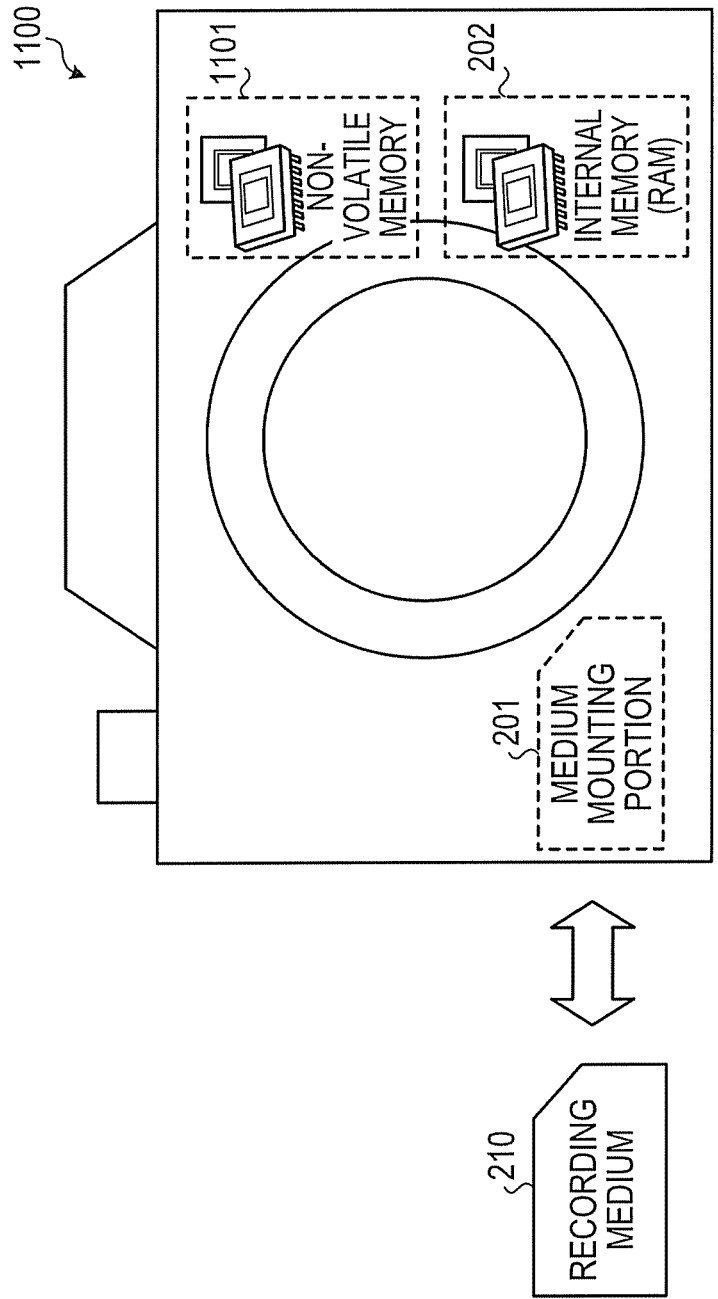
FIG. 13 illustrates second embodiment.

A mounting information retraction area may be arranged inside the digital camera. FIG. 13 illustrates a second embodiment. For example, when the recording medium 210 is coupled to a digital camera 1100, a non-volatile memory 1101 in the digital camera 1100 is cleared. The mounting information is written into the non-volatile memory 1101 when dismounting before a remounting process, and the mounting information is written into the internal memory 202 from the non-volatile memory 1101 in the remounting process to attain fast remounting.

Figure 14:
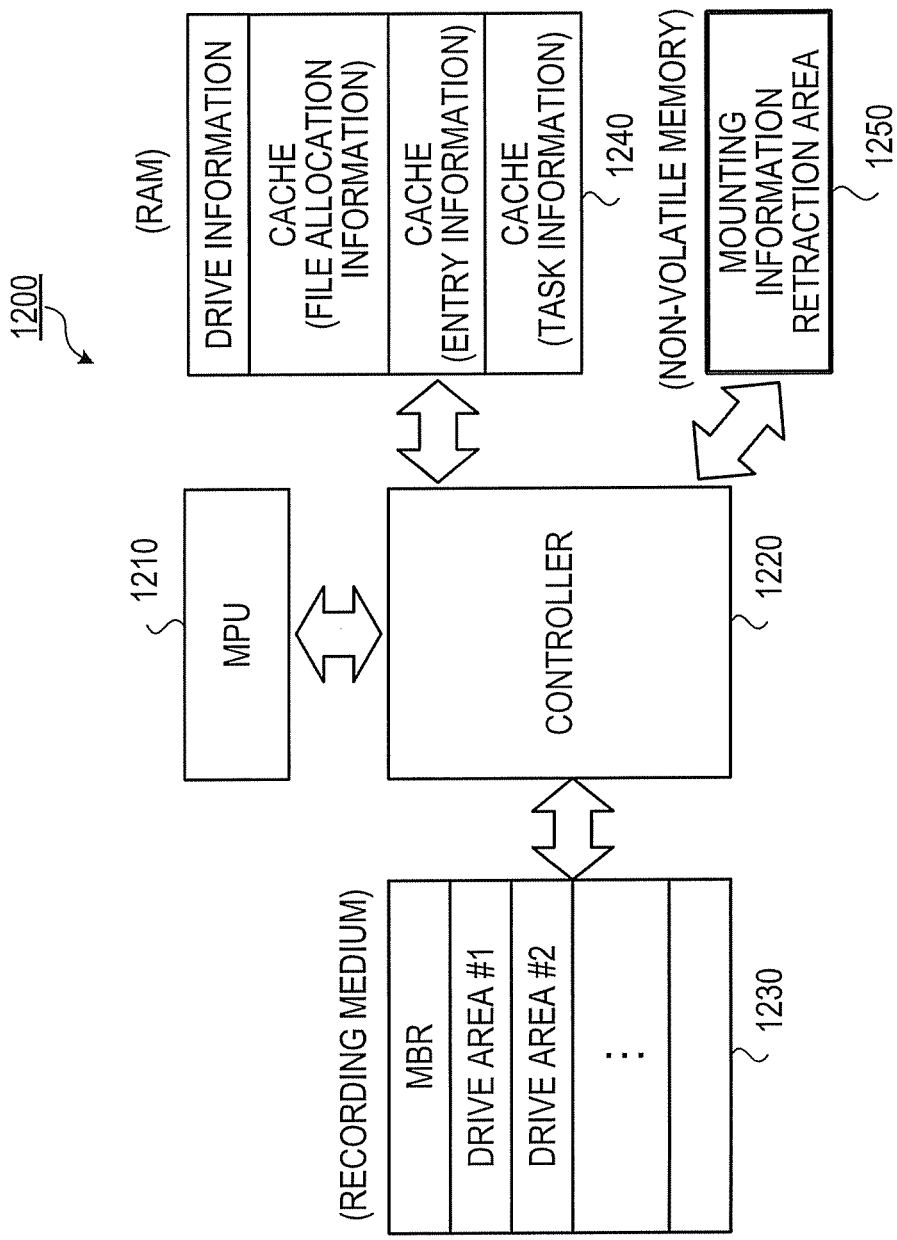
FIG. 14 illustrates an exemplary drive device.

FIG. 14 illustrates an exemplary drive device. An MPU 1210, a controller 1220, and an internal memory (RAM) 1240 of a drive device 1200 may be the MPU, the controller, and the internal memory (RAM) of the first embodiment. The drive device 1200 of the second embodiment includes a non-volatile memory 1250 as a mounting information retraction area. A recording medium 1230 coupled to the drive device 1200 may not include the mounting information retraction area.

The MPU 1210 of the second embodiment includes an extracting unit and a writing unit. The extracting unit extracts management information, which is used for a mounting process of the recording medium 1230, from drive information stored in the internal memory 1240 as mounting information. The writing unit writes the extracted mounting information into an arbitrary mounting information storage area 1250 in the drive device 1200. The MPU 1210 uses the mounting information to execute the mounting process of the recording medium 1230.

Figure 15:
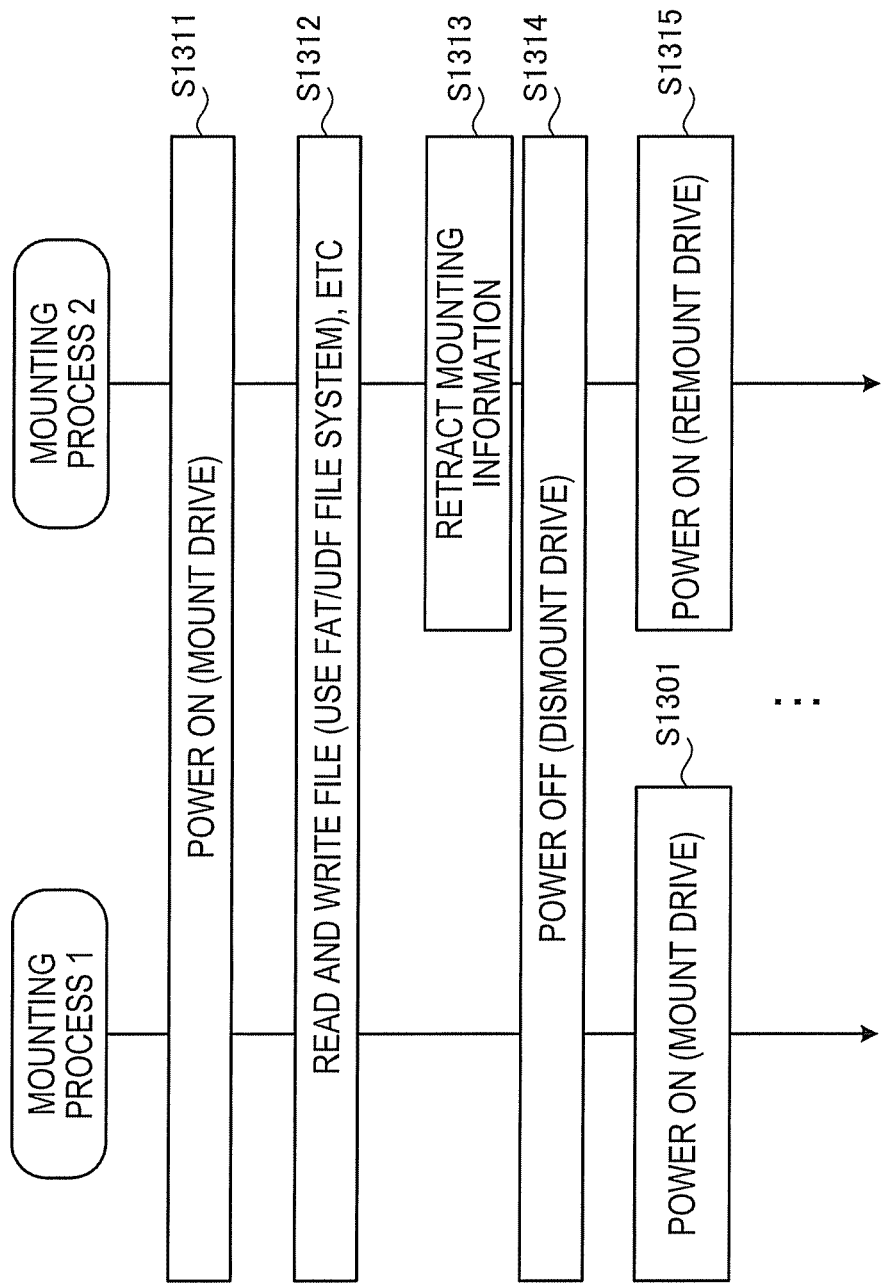
FIG. 15 illustrates an exemplary mounting process.

FIG. 15 illustrates an exemplary mounting process. The mounting process illustrated in FIG. 15, for example, operations S1311 to S1314 and operation S1301, may be substantially the same or similar to the operations illustrated in FIG. 7.

In a mounting process 2 illustrated in FIG. 15, a drive is mounted by the power-on (operation S1311). The mounting process in operation S1311 may be substantially the same or similar to the mounting process of operation S501 illustrated in FIG. 7.

Reading and writing of file are performed according to the applied file system (operation S1312). The MPU executes a command of a dismounting process upon power-off to retract the mounting information to the mounting information retraction area of the non-volatile memory 1250 as a process prior to dismounting (operation S1313). The dismounting process is then executed (operation S1314). A drive is mounted by the next power-on (operation S1315).

Figure 16:
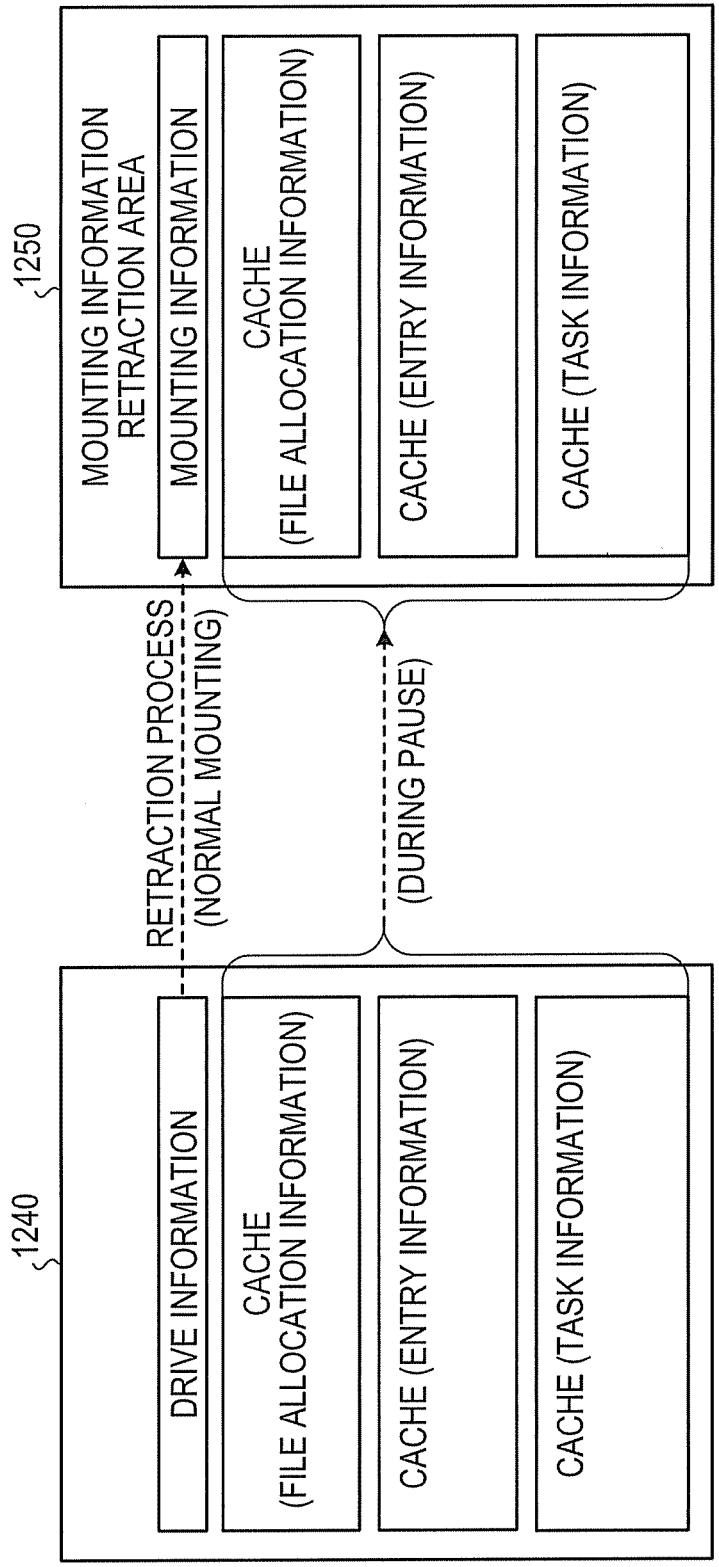
FIG. 16 illustrates an exemplary retraction process of mounting information.

FIG. 16 illustrates an exemplary retraction process of the mounting information. The retraction process of the mounting information is performed as a previous process when the MPU 1210 dismounts by executing a dismounting process command upon power-off. In the normal mounting, the mounting information extracted from the drive information is retracted to the mounting information retraction area of the non-volatile memory 1250, and the retraction process ends. For example, during a pause, the file allocation information, the entry information, and the task information as specific states stored in the cache are retracted to the mounting information retraction area of the non-volatile memory 1250, in addition to the mounting information.

Figure 17:
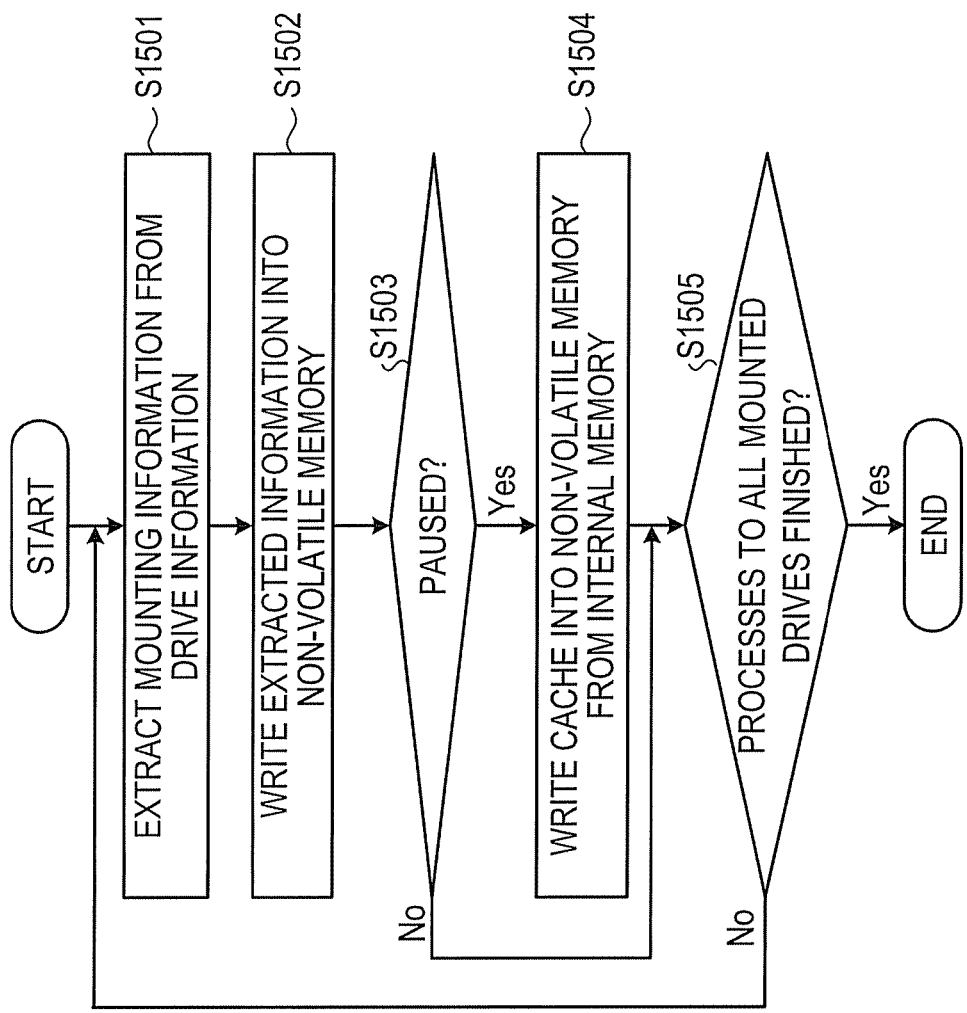
FIG. 17 illustrates an exemplary procedure of a retraction process of mounting information.

FIG. 17 illustrates an exemplary procedure of a retraction process of the mounting information. In FIG. 17, the MPU 1210 of the drive device 1200 extracts the mounting information from the drive information stored in the internal memory 1240 (operation S1501), and the extracted mounting information is written into the mounting information retraction area of the non-volatile memory 1250 (operation S1502).

Whether the process is being paused or not is determined (operation S1503). If the process is determined to be paused (operation S1503: Yes), the MPU 1210 writes the file allocation information, the entry information, and the task information into the cache of the mounting information retraction area of the non-volatile memory 1250 from the cache of the internal memory 1240 (operation S1504). If the process is determined not to be paused in operation S1503 (operation S1503: No), the process moves to operation S1505.

Whether the processes to all drives to be mounted are finished or not is determined (operation S1505), and the processes from operation S1501 are repeated until the processes to all drives are finished (operation S1505: loop of No). When the processes to all drives are finished (operation S1505: Yes), a series of retraction processes ends.

Figure 18:
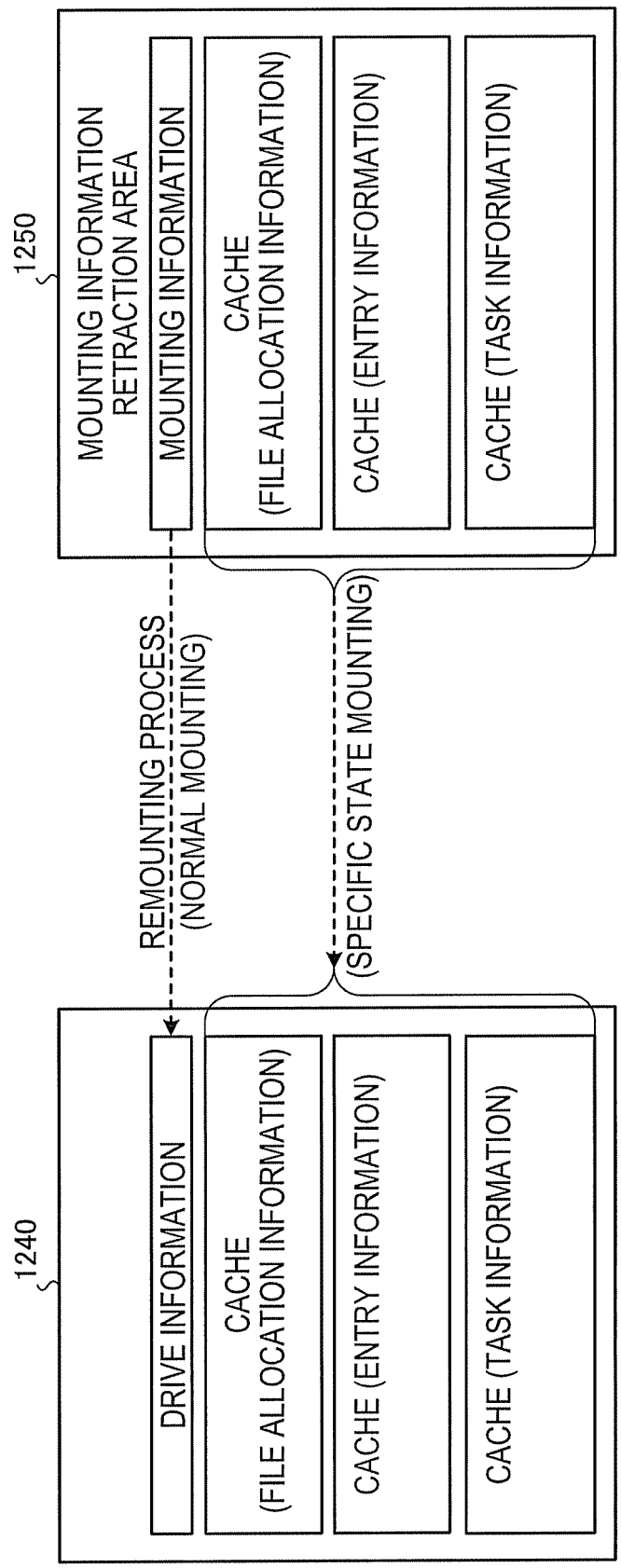
FIG. 18 illustrates an exemplary remounting process.

FIG. 18 illustrates an exemplary remounting process. The mounting process of the recording medium 1230 is executed based on the mounting information stored in the non-volatile memory 1250 inside the drive device 1200 in the remounting process. The timing of the mounting process illustrated in FIG. 18 may be substantially the same or similar to the timing of the mounting process illustrated in FIG. 15. In the normal mounting illustrated in FIG. 18, the mounting process of the recording medium 1230 is executed after the mounting information stored in the non-volatile memory 1250 is written into the drive information of the internal memory 1240. In the specific state mounting, the file allocation information, the entry information, and the task information stored in the cache of the mounting information retraction area are written into the cache of the internal memory 1240. Therefore, a searching process, which takes a lot of time, is not executed.

Figure 19:
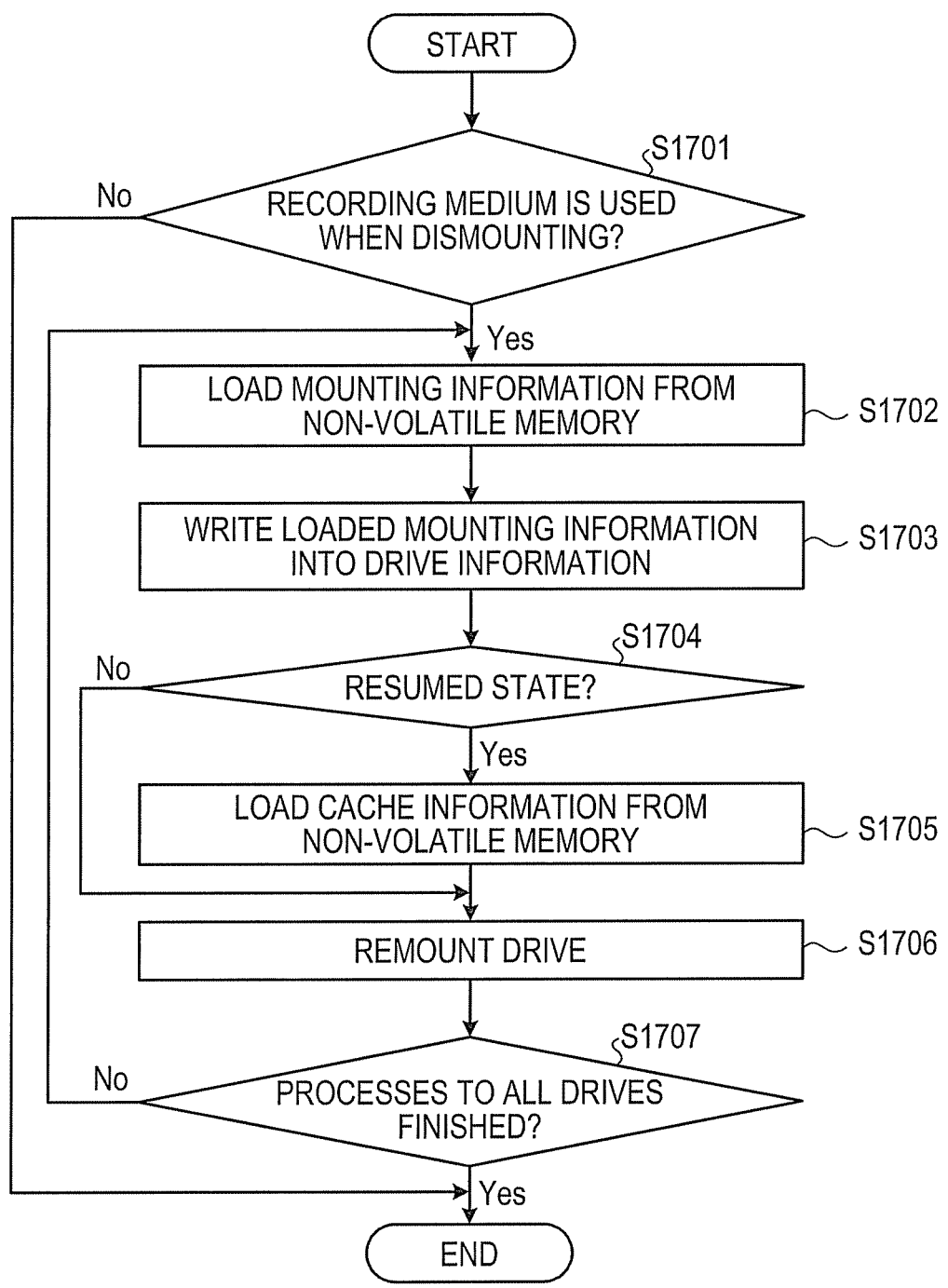
FIG. 19 illustrates an exemplary procedure of a remounting process.

FIG. 19 illustrates an exemplary procedure of the remounting process. Whether the recording medium 1230 is substantially the same as that used in the dismounting process or not is determined (operation S1701). If the recording medium 1230 is not substantially the same (operation S1701: No), the process ends.

Whether or not the recording medium 1230 is substantially the same as that used in the dismounting process is determined in operation S1701. For example, a detecting unit may be arranged on the medium mounting portion 201 or the like of the digital camera 1100. For example, a weak current flows in the detecting unit, even if the digital camera 1100 is powered off, when the recording medium 1230 is completely coupled, and the current does not flow when the recording medium 1230 is not coupled. While the digital camera 1100 is powered off, the detecting unit detects that the current does not flow. Therefore, the detection of current determines whether the recording medium 1230 is substantially the same or not.

If the recording medium 1230 is determined to be substantially the same in operation S1701 (operation S1701: Yes), the mounting information is loaded from the non-volatile memory 1250 (operation S1702). The loaded mounting information is written as drive information (operation S1703). For example, whether a resumed state is set or not is determined (operation S1704). If the resumed state is determined to be set (operation S1704: Yes), the information of the cache of the non-volatile memory 1250 is loaded (operation S1705), and the drive is remounted (operation S1706). If the resumed state is determined not to be set in operation S1704 (operation S1704: No), the process of operation S1706 is executed.

After the remounting, whether the processes to all drives to be mounted are finished or not is determined (operation S1707), and the processes from operation S1702 are repeated until the processes to all drives are finished (operation S1707: loop of No). If the processes to all drives are finished (operation S1707: Yes), the remounting process ends.

In the remounting process of the second embodiment, the mounting information is retracted to the mounting information retraction area of the non-volatile memory 1250 and transferred to the internal memory 1240. There may be almost no access to the recording medium 1230, and the read value may not be checked. Therefore, the processing time is reduced.

The remounting process using the non-volatile memory 1250 is sped up in the second embodiment. For example, the mounting information may be retracted before the power-on of operation S1311 illustrated in FIG. 15. A fast first mounting process is also performed in the second embodiment, as in the first embodiment.

The embodiments may also be applied to an embedded device, such as a digital camera, a portable terminal device, and a portable AV player. A computer may execute a program to perform the mounting method of the embodiments. The processes included in the drive device are described in the program describing functions of the drive device. The computer executes the program to execute the mounting process. The program may be recorded in a computer readable storage medium such as a hard disk (HD), a flexible disk (FD), a CD-ROM/R/RW, a DVD-ROM/R/RW/RAM, an MO, and a semiconductor memory. The computer reads the recording medium to execute the program. The program may be distributed through a network such as the Internet.

The drive devices 400 and 1200 of the embodiments may be applied to an IC for specific use such as a standard cell and a structured ASIC (Application Specific Integrated Circuit), or a PLD (Programmable Logic Device) such as an FPGA. The functions of the drive devices 400 and 1200 may be defined by the HDL description or the like, and logically synthesized HDL description may be provided to the ASIC or the PLD to manufacture the drive devices 400 and 1200.

Example embodiments of the present invention have now been described in accordance with the above advantages. It will be appreciated that these examples are merely illustrative of the invention. Many variations and modifications will be apparent to those skilled in the art.

The invention claimed is:

1. A recording medium coupled to a drive device, the recording medium comprising:
   a mounting information storage area that stores mounting information and a cache; and
   a master boot record that stores a starting location and an area size of a drive area,
   wherein the mounting information is usable for a mounting process of the recording medium by the drive device, the mounting information being management information that is used by the drive device to mount drive areas for storing actual data, and
   wherein the cache includes file allocation information, entry information and task information, the cache stored to the mounting information storage area after the mounting information is stored to the mounting information storage area when the drive device is set to a specific state.

2. The recording medium according to claim 1, wherein the specific state is a mounting process for reading the specific file set by a user and setting a specific state, such as a pause or a suspension after the normal mounting, the specific file includes, for example, information of one or more generations including information of one or more drives, directories, or files that are most recently accessed.

3. The recording medium according to claim 1, wherein the mounting information is preferentially read in the mounting process.

4. The recording medium according to claim 1, wherein the mounting information includes a number of drives to be mounted and a mounting start location.

5. The recording medium according to claim 1, wherein a type of the mounting process executed in accordance with the mounting information includes a normal mounting process and a specific state mounting process, the specific state mounting process including a specific process which is performed after the normal mounting process.

6. A drive device connectable to a recording medium comprising:
   a memory that stores drive information related to data storage to the recording medium;
   an extractor that extracts mounting information out of the drive information, the mounting information being management information that is used by the drive device to mount drive areas for storing actual data;
   a writer that writes the extracted mounting information into a mounting information storage area; and
   a mounting processor that executes a mounting process of the recording medium based on the mounting information,
   wherein the writer writes to a cache stored in the mounting information storage area after the mounting information is written to the mounting information storage area when the drive device is set to a specific state, the cache including file allocation information, entry information and task information.

7. The device drive according to claim 6, wherein the mounting information storage area stores the mounting information used in the mounting process.

8. The drive device according to claim 6, wherein the extractor extracts information used in the mounting process of the recording medium from the drive information stored in the memory as mounting information after a specific file is written into the mounting information storage area.

9. The drive device according to claim 6, wherein, when a specific file including information concerning at least one of an accessed drive, an accessed directory, and a file is loaded after the mounting process, the writer stores the specific file after the mounting information being stored in the mounting information storage area.

10. The drive device according to claim 9, wherein the accessed drive, the accessed directory or the accessed file stored is that which was most recently accessed.

11. The drive device according to claim 6, comprising:
    a first detector that detects a connection of the recording medium, and
    wherein the extractor extracts information used in the mounting process of the recording medium from the drive information stored in the memory as mounting information when a connection of the recording medium is detected.

12. The drive device according to claim 6, comprising:
    a second detector that detects an activation of the drive device, and
    wherein the extractor extracts information used in the mounting process of the recording medium from the drive information stored in the memory as mounting information when an activation of the drive device is detected.

13. The drive device according to claim 6, comprising:
    a detector that detects a stoppage of the drive device, and
    wherein the extractor extracts information used in the mounting process of the recording medium from the drive information stored in the memory as mounting information when a stoppage of the drive device is detected.

14. The drive device according to claim 6, wherein the writer writes the mounting information stored in the mounting information storage area into the memory when an execution instruction of the mounting process is received, and the mounting processor generates drive information based on the mounting information.

15. The drive device according to claim 14, wherein the mounting processor repeatedly executes the mounting process for each drive area.

16. A mounting method to make a recording medium usable, the mounting method comprising:
    extracting, using a computer, mounting information used in a mounting process of the recording medium out of drive information stored in a memory, the mounting information is management information that is used by a drive device to mount drive areas for storing actual data;
    writing the extracted mounting information into a mounting information storage area of the recording medium;
    executing a mounting process of the recording medium based on the mounting information written into the mounting information storage area;

storing the mounting information to the mounting information storage area at a timing of reading or writing of a file operation; and storing data in a cache of the mounting information storage area after the mounting information is stored to the mounting information storage area when the drive device is set to a specific state, the data including file allocation information, entry information and task information.

17. The mounting method according to claim 16, wherein the mounting information stored in the mounting information storage area is stored in the memory when an execution instruction of the mounting process of the recording medium is received, and the stored mounting information is used to generate the drive information.

18. The mounting method according to claim 16, wherein a computer with the memory, coupled to the recording medium, executes the mounting process.

* * * * *

UNITED STATES PATENT AND TRADEMARK OFFICE
CERTIFICATE OF CORRECTION

| | | |
|---|---|---|
| PATENT NO. | : 8,583,862 B2 | Page 1 of 1 |
| APPLICATION NO. | : 12/545177 | |
| DATED | : November 12, 2013 | |
| INVENTOR(S) | : Toshimasa Suzuki | |

It is certified that error appears in the above-identified patent and that said Letters Patent is hereby corrected as shown below:

In the Claims:

In Column 10, Line 5, In Claim 7, delete "The device drive" and insert -- The drive device --, therefor.

Signed and Sealed this
Eighteenth Day of February, 2014

Michelle K. Lee
*Deputy Director of the United States Patent and Trademark Office*